(12) United States Patent
Shimamura

(10) Patent No.: US 8,754,607 B2
(45) Date of Patent: Jun. 17, 2014

(54) ELECTRICALLY DRIVEN VEHICLE AND CHARGE CONTROL METHOD FOR ELECTRICALLY DRIVEN VEHICLE

(75) Inventor: Koji Shimamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 86 days.

(21) Appl. No.: 13/612,079

(22) Filed: Sep. 12, 2012

(65) Prior Publication Data

US 2013/0268149 A1 Oct. 10, 2013

(30) Foreign Application Priority Data

Apr. 5, 2012 (JP) ................................. 2012-086468

(51) Int. Cl.
*H02J 7/00* (2006.01)
*B60L 1/00* (2006.01)
*B60L 3/04* (2006.01)

(52) U.S. Cl.
CPC ..... *B60L 1/00* (2013.01); *B60L 3/04* (2013.01)
USPC .......... 320/104; 180/65.1; 320/109; 307/10.1

(58) Field of Classification Search
None
See application file for complete search history.

(56) References Cited

FOREIGN PATENT DOCUMENTS

| DE | 10 2010 009 727 A1 | 9/2011 |
|----|--------------------|--------|
| JP | 05-211724 A | 8/1993 |
| JP | 9-322313 A | 12/1997 |
| JP | 09-322313 A | 12/1997 |
| JP | 2000-115901 A | 4/2000 |
| JP | 2009-089452 A | 4/2009 |

OTHER PUBLICATIONS

Preliminary Notice of Reasons for Rejection, dated Apr. 9, 2013, Patent Application No. 2012-086468.
German Office Action dated Apr. 24, 2013 issued in German Application No. 10 2012 219 731.1.

*Primary Examiner* — Thomas Tarcza
*Assistant Examiner* — Richard Goldman
(74) *Attorney, Agent, or Firm* — Sughrue Mion, PLLC; Richard C. Turner

(57) ABSTRACT

Provided is an electrically driven vehicle (10) loaded with a driving storage battery (20) charged by electric power supplied from a power supply outside the vehicle, including an occupant detection sensor (70) for detecting whether or not an occupant is in the electrically driven vehicle (10), rotation sensors (80) for detecting presence/absence of rotations of wheels (90) provided to the electrically driven vehicle (10), and a charge control unit (60) for determining whether or not a state in which the occupant detection sensor (70) detects that the occupant is not in the electrically driven vehicle (10) and the wheel rotation sensors (80) detect that the wheels (90) are not rotating has continued for a predetermined period, and starting, when the charge control unit (60) determines that the state has continued for the predetermined period, the charge of the driving storage battery (20).

6 Claims, 3 Drawing Sheets

ELECTRICALLY DRIVEN VEHICLE AND CHARGE CONTROL METHOD FOR ELECTRICALLY DRIVEN VEHICLE

BACKGROUND OF THE INVENTION

1. Field of the Invention

The present invention relates to an electrically driven vehicle and a charge control method for the electrically driven vehicle, and more particularly, to an electrically driven vehicle loaded with an electric power storage device charged by electric power supplied from a power supply outside the vehicle, and a charge control method for the electrically driven vehicle.

2. Description of the Related Art

In recent years, consciousness to the environment has been increasing. Accordingly, an electrically driven vehicle such as an electric vehicle or a plug-in hybrid vehicle, which is loaded with a driving storage battery which can be charged by electric power supplied from a power supply outside the vehicle, and employs a motor operated by the driving storage battery as a power supply, is gaining attention.

The electrically driven vehicle is charged during being parked, by connecting a power supply outside the vehicle and the electrically driven vehicle with each other using a charge cable. In this way, the charge cable is connected to the electrically driven vehicle during being externally charged, and, when the electrically driven vehicle moves from the parking location during the charge, the connected charge cable is disconnected, and arc discharge is generated from connection terminals, resulting in a possible damage of the connection terminals and the like. Therefore, Japanese Patent Application Laid-open No. Hei 09-322313 describes an electrically driven vehicle, which enables charge only if a shift position of an automatic transmission for driving the vehicle is in a parking range, and which includes a lock mechanism for preventing the shift position from moving during the charge.

However, if the vehicle is chargeable only when the shift position is in the parking range, the charge will not start in a case where a user connects the charge cable, but forgets to operate the shift position to the parking range. In addition, because the charge cable is connected outside the vehicle, it is not always the case that the user confirms the start of the charge. In this case, there may occur a problem in that the user cannot use the electrically driven vehicle because the charged amount is not sufficient when the user wants to use the electrically driven vehicle.

SUMMARY OF THE INVENTION

The present invention has been made in view of the above-mentioned problem, and therefore has an object to provide an electrically driven vehicle and a charge control method for an electrically driven vehicle enabling charge independently of a shift position.

According to an exemplary embodiment of the present invention, there is provided an electrically driven vehicle, including: a driving storage battery charged by electric power supplied from a power supply provided externally; an occupant detection unit for detecting whether or not an occupant is in the electrically driven vehicle; a wheel rotation detection unit for detecting presence/absence of a rotation of a wheel provided to the electrically driven vehicle; and a charge control unit for determining whether or not a state in which the occupant detection unit detects that the occupant is not in the electrically driven vehicle and the wheel rotation detection unit detects that the wheel is not rotating has continued for a predetermined period, and starting, when determining that the state has continued for the predetermined period, the charge of the driving storage battery.

According to the exemplary embodiment of the present invention, there is provided the electrically driven vehicle, including: the driving storage battery charged by the electric power supplied from the power supply provided externally; the occupant detection unit for detecting whether or not the occupant is in the electrically driven vehicle; the wheel rotation detection unit for detecting the presence/absence of the rotation of the wheel provided to the electrically driven vehicle; and the charge control unit for determining whether or not the state in which the occupant detection unit detects that the occupant is not in the electrically driven vehicle and the wheel rotation detection unit detects that the wheel is not rotating has continued for the predetermined period, and starting, when determining that the state has continued for the predetermined period, the charge of the driving storage battery. Therefore, it is possible to obtain an effect that the charge can be performed even when the occupant forgets to operate the shift position to a range for charge because the charge is enabled independently of the shift position.

DETAILED DESCRIPTION OF THE PREFERRED EMBODIMENTS

First Embodiment

Figure 1:
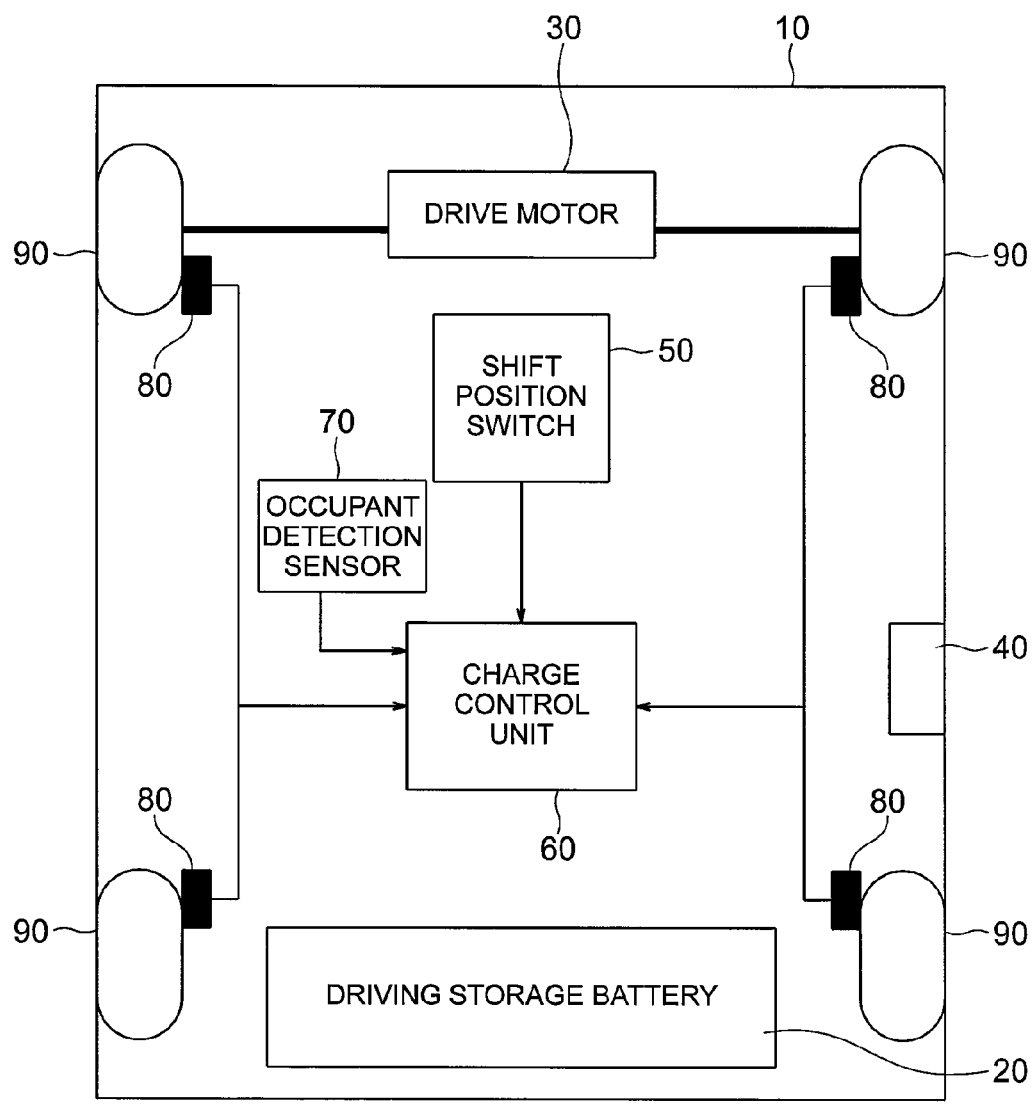
FIG. 1 is a diagram illustrating a configuration of an electrically driven vehicle according to a first embodiment and a second embodiment of the present invention.

A description is now given of an electrically driven vehicle according to a first embodiment of the present invention with reference to the accompanying drawings. FIG. 1 is a block diagram illustrating a configuration of the electrically driven vehicle according to the first embodiment of the present invention. Note that, in FIG. 1, components which do not directly relate to the present invention are omitted.

An electrically driven vehicle 10 includes a driving storage battery (electric power storage device) 20 charged by electric power supplied from a power source provided outside the vehicle, a drive motor 30 which is driven by electric power of the driving storage battery 20, a charge connector 40 for connecting a charge cable to the vehicle, a shift position switch 50 for receiving an instruction of a shift position by a vehicle occupant (driver), a charge control unit 60 for controlling the charge of the driving storage battery 20, an occupant detection sensor 70 (occupant detection unit) for detecting that one or more vehicle occupants are in the vehicle 10, and rotation sensors 80 (wheel rotation detection units) for each detecting a rotation of each of wheels 90.

The electric power is supplied to the driving storage battery 20 of the electrically driven vehicle 10 from the power source provided outside the vehicle 10 via the charge cable connected to the charge connector 40, and the driving storage battery 20 is charged.

The drive motor 30 is driven by the electric power from the driving storage battery 20. The electrically driven vehicle 10 travels by rotating the wheels 90 by a drive force of the drive motor 30.

The shift position (gear position) of the electrically driven vehicle 10 includes a plurality of ranges such as a parking range (P) for maintaining a stationary state of the vehicle 10, a drive range (D) for switching the travel direction of the vehicle 10 to a forward direction, a reverse range (R) for switching the travel direction of the vehicle 10 to a reverse direction, a neutral range (N), and the like. Note that, those ranges are examples of the shift positions, and the shift positions are not limited thereto. An occupant selects an appropriate range out of those ranges each time, and the shift position switch 50 receives the instruction of the selected range. The shift position switch 50 notifies the charge control unit 60 of a signal indicating the range selected by the occupant.

The occupant detection sensor 70 is provided in the electrically driven vehicle 10, detects presence/absence of an occupant in the electrically driven vehicle 10, and notifies the charge control unit 60 of the detection result. Note that, as the occupant detection sensor 70, any type of sensor such as a pressure sensor, an electric field sensor, and an infrared sensor may be used as long as the sensor is capable of detecting the presence/absence of an occupant.

The rotation sensor 80 is provided for each of the wheels 90 and detects the rotation of the wheel 90 to thereby notify the charge control unit 60 of an output corresponding to the rotation speed. Note that, according to the first embodiment, the rotation of each of the wheels 90 is detected by the rotation sensor 80 provided for each of the wheels 90, but a sensor for detecting the rotation of the drive motor 30 may be provided to detect the rotation of the drive motor 30.

When the charge control unit 60 determines, based on the signal from the shift position switch 50, that the shift position specified by the occupant is in the parking range, the charge control unit 60 does not carry out the detection by the occupant detection sensor 70 and the detection by the rotation sensors 80 (or independently of the detection results even if the detections are carried out), and starts the charge of the driving storage battery 20. Moreover, when the charge control unit 60 determines, based on the signal from the shift position switch 50, that the shift position specified by the occupant is in a range other than the parking range, the charge control unit 60 receives the signal (result of detecting an occupant) from the occupant detection sensor 70 and the signals (outputs corresponding to the rotation speeds) from the rotation sensors 80, and, when the charge control unit 60 determines, based on those signals, that a state in which an occupant is not in the electrically driven vehicle 10 and the wheels 90 are not rotating has continued for a predetermined period, the charge control unit 60 starts the charge of the driving storage battery 20.

Figure 2:
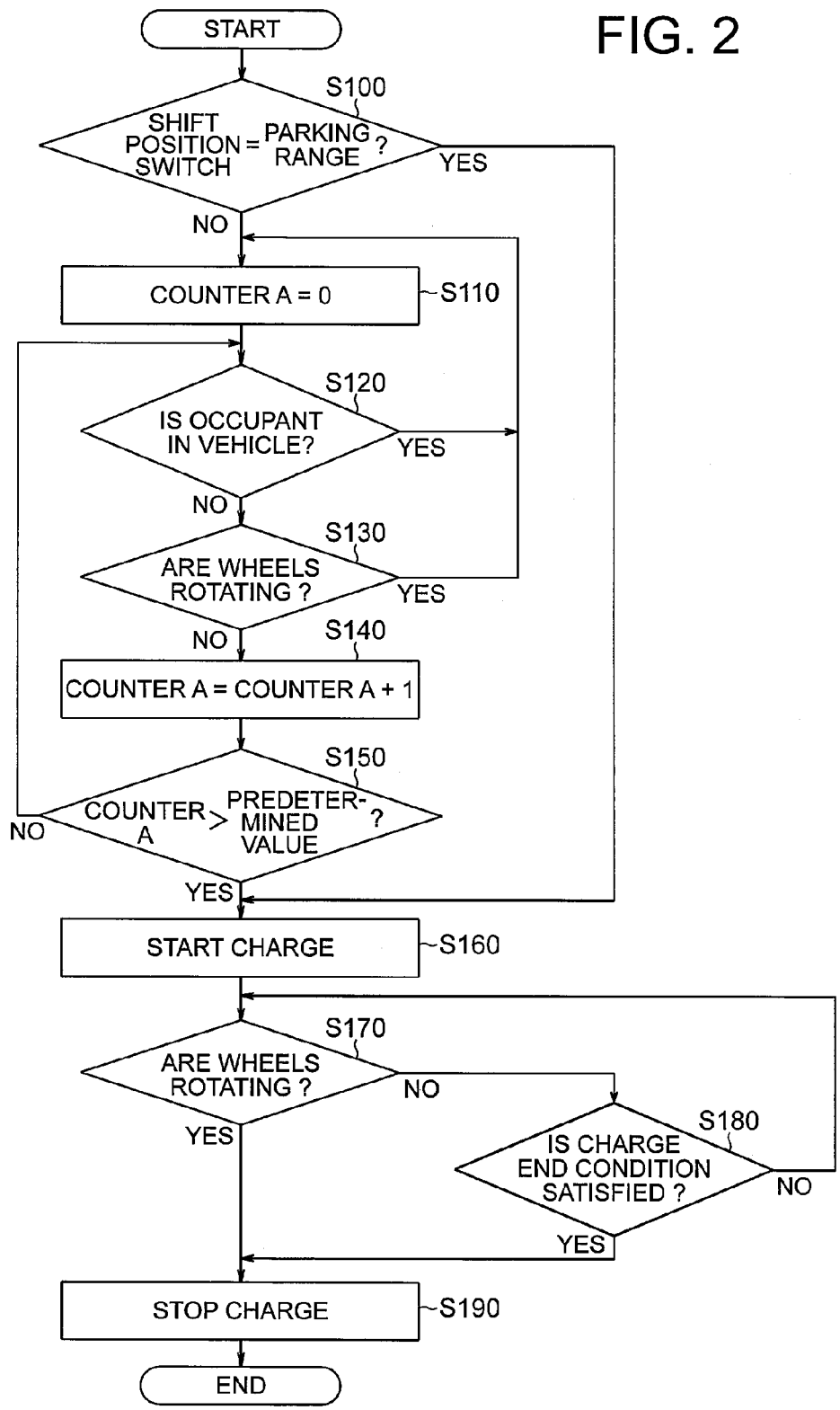
FIG. 2 is a flowchart illustrating charge control processing for the electrically driven vehicle according to the first embodiment of the present invention.

Referring to a flowchart of FIG. 2, a description is now given of a flow of charge processing on the electrically driven vehicle 10 according to the first embodiment of the present invention. This processing is carried out from the time point when the charge control unit 60 detects "charge instruction to the driving storage battery 20" by the occupant. Note that, "charge instruction to the driving storage battery 20" may be connecting the charge cable to the charge connector 40 of the electrically driven vehicle 10, or may be an operation of depressing a predetermined button by the occupant after the connection of the charge cable.

As illustrated in FIG. 2, in Step S100, the charge control unit 60 determines, based on the signal from the shift position switch 50, whether or not the range selected by the occupant is the parking (P) range. When the charge control unit 60 determines that the range selected on the shift position switch 50 is not the parking range (NO), the charge control unit 60 proceeds to Step S110. On the other hand, when the charge control unit 60 determines that that the selected range is the parking range (YES), the charge control unit 60 proceeds to Step S160, and starts the charge.

In Step S110, the charge control unit 60 assigns an initial value 0 to a counter A for measuring the predetermined period, and proceeds to Step S120.

In Step S120, the charge control unit 60 determines, based on the detection result obtained by the occupant detection sensor 70, whether or not one or more occupants are in the electrically driven vehicle 10. When the charge control unit 60 determines that at least one occupant is present in the electrically driven vehicle 10 (YES), the charge control unit 60 returns to Step S110, and when the charge control unit 60 determines that no occupant is present in the electrically driven vehicle 10 (NO), the charge control unit 60 proceeds to Step S130.

In Step S130, the charge control unit 60 determines, based on the signals from the rotation sensors 80, whether or not the wheels 90 of the electrically driven vehicle 10 are rotating. When the charge control unit 60 determines that the wheels 90 of the electrically driven vehicle 10 are rotating (YES), the charge control unit 60 returns to Step S110, and when the charge control unit 10 determines that the wheels 90 of the electrically driven vehicle 10 are not rotating (NO), the charge control unit 60 proceeds to Step S140.

In Step S140, the charge control unit 60 increments the counter A. In other words, the charge control unit 60 adds one to the value of the counter A, and proceeds to Step S150.

In Step S150, the charge control unit 60 determines whether or not the value of the counter A is larger than a predetermined value. When the charge control unit 60 determines that the value is equal to or smaller than the predetermined value (NO), the charge control unit returns to Step S120, and, on the other hand, when the charge control unit 60 determines that the count is larger than the predetermined value (YES), the charge control unit 60 proceeds to Step S160, and starts the charge.

In this way, the processing from Step S120 to Step S150 is repeated until the value of the counter A exceeds the predetermined value. A processing period of each of the steps is approximately the same and constant for each time, and hence the processing from Step S120 to Step S150 is repeated at an approximately constant time cycle. Thus, by counting the number of the repetitions by the counter A, it is possible to measure as to whether or not the predetermined period has elapsed. Accordingly, the counter A constitutes a predetermined period measurement unit for measuring as to whether or not the predetermined period has elapsed.

In Step S170, the charge control unit 60 determines, based on the signals from the rotation sensors 80, whether or not the wheels 90 of the electrically driven vehicle 10 are rotating during the charge. When the charge control unit 60 determines that the wheels 90 of the electrically driven vehicle 10 are not rotating (NO), the charge control unit 60 proceeds to Step S180. On the other hand, when the charge control unit 10 determines that the wheels 90 of the electrically driven vehicle 10 are rotating (YES), the charge control unit 60 proceeds to Step S190.

In Step S180, the charge control unit 60 determines whether or not a charge end condition is satisfied. When the charge control unit 60 determines that the charge end condition is not satisfied (NO), the charge control unit 60 returns to Step S170, and continues the charge. On the other hand, when the charge control unit 60 determines that the charge end condition is satisfied (YES), the charge control unit 60 proceeds to Step S190. Note that, the charge end condition may be appropriately set to an arbitrary condition such as "the driving storage battery 20 is fully charged", which is not directly relate to the present invention. Accordingly, the charge end condition is not detailed here.

In Step S190, the charge control unit 60 stops the charge of the driving storage battery 20, thereby finishing the charge processing flow.

As described above, according to the first embodiment, when the charge cable connected to the power source external to the electrically driven vehicle 10 is connected to the charge connector 40, if the range selected on the shift position switch 50 is the parking range (P), the charge is started independently of the presence/absence of the occupant and the presence/absence of the rotations of the wheels 90. In this way, when it is ensured that the electrically driven vehicle 10 does not move from a parking location, the charge is quickly started.

Moreover, when the charge cable connected to the power source external to the electric vehicle 10 is connected to the charge connector 40, if the range selected by the shift position switch 50 is a range other than the parking range (P), the presence/absence of an occupant is determined based on the detection result obtained by the occupant detection sensor 70. When an occupant is not detected, then, whether or not the wheels 90 are rotating is determined based on the detection results obtained by the rotation sensors 80. When the wheels 90 are not rotating, the counting of the predetermined period starts. In a case where the state in which no occupant is present and the wheels 90 are not rotating has continued for the predetermined period, the charge starts. In this way, even if the parking switch 50 is in a range other than the parking range, the charge starts if no occupant is present and the wheels 90 are not rotating for the predetermined period. Accordingly, it is possible to start the charge even if the occupant forgets to operate the shift position to the parking range.

Further, during the charge, based on the detection results obtained by the rotation sensors 80, it is determined whether or not the wheels 90 are rotating. When it is determined that the wheels 90 are rotating, the charge is stopped. Therefore, even if, during the charge, the electrically driven vehicle 10 moves from a parking location for some reason and the connected charge cable is disconnected, it is possible to prevent a damage of the connection terminals due to arc discharge of the connection terminals, and the like.

As described above, according to the first embodiment, the electrically driven vehicle 10 loaded with the driving storage battery 20 charged by the electric power supplied from the external power supply includes the occupant detection sensor 70 serving as an occupant detection unit for detecting whether or not an occupant is in the electrically driven vehicle 10, the rotation sensors 80 serving as wheel rotation detection units for detecting the rotations of the wheels 90 of the electrically driven vehicle 10, and the charge control unit 60 for starting the charge in a case where, based on the signals from the occupant detection sensor 70 and the rotation sensors 80, the charge control unit 60 determines that the state in which there is no occupant and the wheels 90 are not rotating has continued for the predetermined period. The electrically driven vehicle 10 starts the charge independently of the shift position when there is no occupant and the wheels 90 are not rotating. Therefore, it is possible to carry out the charge even if an occupant forgets to operate the shift position, and it is possible to avoid a situation in that, when an occupant wants to use the electrically driven vehicle 10, an amount of stored electricity is not sufficient for using the electrically driven vehicle 10.

Moreover, according to this embodiment, when the charge control unit 60 determines that the range selected by the shift position switch 50 is the parking range (P), the charge control unit 60 starts the charge independently of the presence/absence of an occupant and the presence/absence of the rotations of the wheels 90. Accordingly, it is possible to start the charge immediately when the electrically driven vehicle 10 is in the state in which the electrically driven vehicle 10 does not move during the charge.

Moreover, accordingly to this embodiment, the charge control unit 60 is configured so as to stop the charge when the charge control unit 60 detects that the wheels 90 are rotating during the charge. Accordingly, it is possible to stop the charge immediately even if the rotations of the wheels 90 are detected during the charge, and hence even if, during the charge, the electrically driven vehicle 10 moves from a parking location and the connected charge cable is disconnected, it is possible to prevent a damage of the connection terminals due to arc discharge of the connection terminals, and the like.

Note that, according to this embodiment, the example in which, when the charge control unit 60 detects the rotations of the wheels 90 during the charge, the charge control unit 60 stops the charge and finishes the charge processing flow is described. However, after the stop of the charge, the monitoring of the state of the vehicle by means of the occupant detection sensor 70 and the rotation sensors 80 may be continued for the sake of safety. In this case, for example, a liquid crystal screen or the like installed in the electrically drive vehicle 10 may display on the screen the state in which the charge has been stopped and the subsequent detection results obtained by the occupant detection sensor 70 and the rotation sensors 80, thereby providing the occupant with the information before the occupant restarts the operation. Even in this case, the charge control unit 60 does not restart the charge even if the charge control unit 60 determines that the state in which no occupant is in the electrically driven vehicle 10 and the wheels 90 are not rotating has continued for a predetermined period after the charge control unit 60 stops the charge. The electrically driven vehicle 10, which has once moved for some reason, may move again, and hence, according to this embodiment, with this configuration, the charge is stopped in a case where there is a slight possibility that the electrically driven vehicle 10 moves from the parking location during the charge, and, after that, the charge is not restarted independently of the detection results obtained by the occupant detection sensor 70 and the rotation sensors 80. Accordingly, it is possible to reliably prevent the damage of the connection terminals due to arc discharge of the connection terminals and the like.

Second Embodiment

A configuration of the electrically driven vehicle 10 according to a second embodiment of the present invention is the same as the configuration of the above-mentioned first embodiment which is illustrated in FIG. 1. Therefore, FIG. 1 is referred to and a description thereof is omitted.

Figure 3:
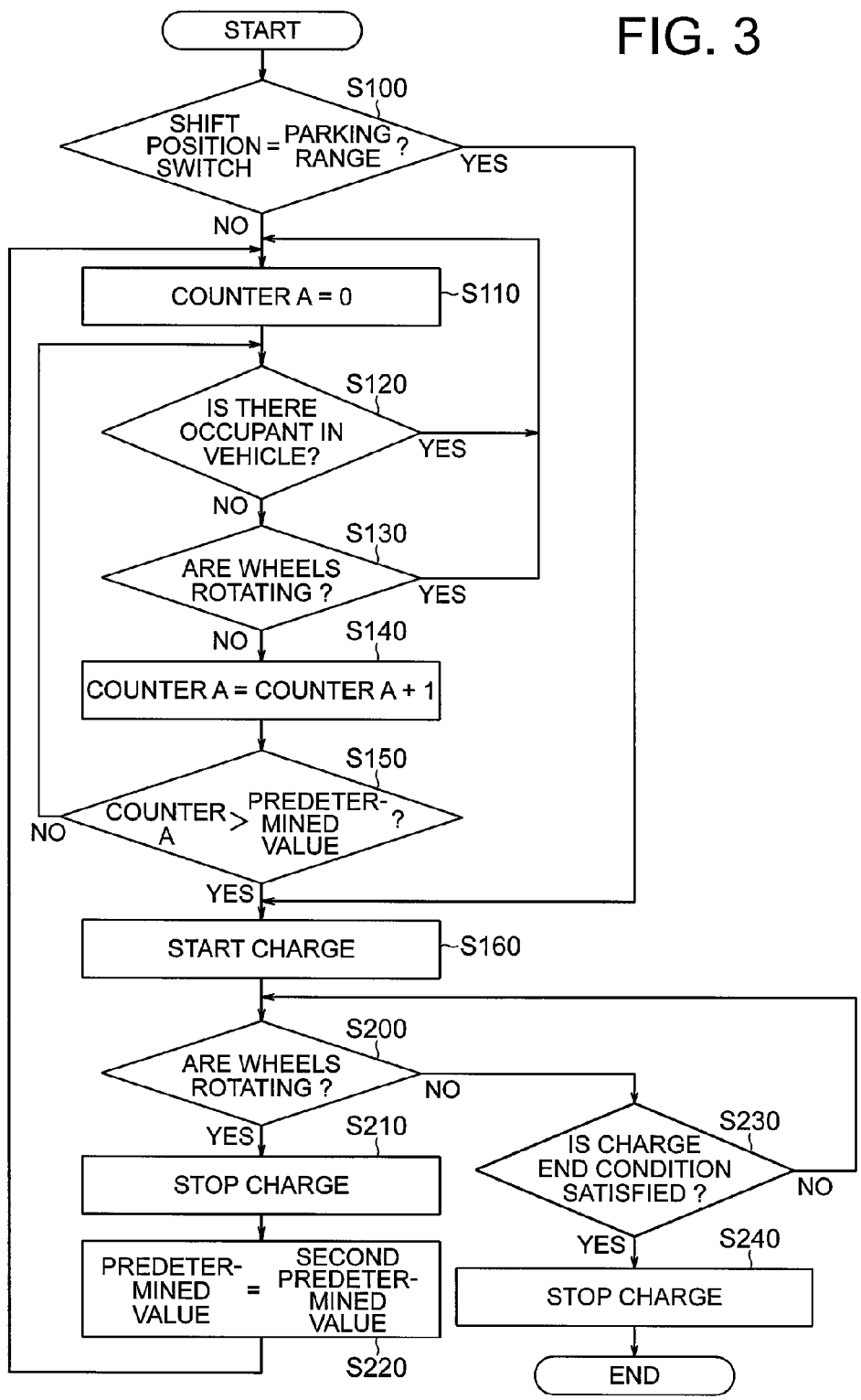
FIG. 3 is a flowchart illustrating charge control processing for the electrically driven vehicle according to the second embodiment of the present invention.

FIG. 3 is a flowchart illustrating charge processing carried out by the charge control unit 60 of the electrically driven vehicle 10 according to the second embodiment. In FIG. 3, processing from Step S100 to Step S160 represents the same processing content as in the steps of FIG. 2 described in the first embodiment. Accordingly, the flow of the processing until the start of the charge is the same as that of the above-mentioned first embodiment (FIG. 2), and hence a description is omitted.

According to the second embodiment, when the charge is started in Step S160, then, the charge control unit 60 determines in Step S200, based on the signals from the rotation sensors 80, whether or not the wheels 90 of the electrically driven vehicle 10 are rotating during the charge. When the charge control unit 60 determines that the wheels 90 of the electrically driven vehicle 10 are not rotating (NO), the charge control unit 60 proceeds to Step S230. On the other hand, when the charge control unit 10 determines that the wheels 90 are rotating (YES), the charge control unit 60 proceeds to Step S210.

In Step S230, the charge control unit 60 determines whether or not a charge end condition is satisfied. When the charge control unit 60 determines that the charge end condition is not satisfied (NO), the charge control unit 60 returns to Step S200, and continues the charge. On the other hand, when the charge control unit 60 determines that the charge end condition is satisfied (YES), the charge control unit 60 proceeds to Step S240. Note that, the charge end condition is, as in the first embodiment (FIG. 2), appropriately set to a condition such as "the driving storage battery 20 is fully charged".

In Step S210, the charge control unit 60 stops the charge and, in the subsequent Step S220, the charge control unit 60 updates the predetermined value for the counter A, which is used in Step S150, to a second predetermined value, and returns to Step S110. Note that, the second predetermined value may be the same value as the predetermined value in Step S150 according to the first embodiment or may be a different value.

In Step S240, the charge control unit stops the charge and the charge processing flow ends.

In this way, the second embodiment has the configuration with which, during the charge, according to the detection results obtained by the rotation sensors 80, it is determined whether or not the wheels 90 are rotating. Moreover, with this configuration, when it is determined that the wheels 90 are rotating, the charge is once stopped, and after that, in a case where the state in which no occupant is in the electrically drive vehicle 10 and the wheels 90 are not rotating has continued for the predetermined period (until the value of the counter A exceeds the second predetermined value), the charge is restarted. Thus, according to the second embodiment, even if the electrically driven vehicle 10 slightly moves from the parking location for some reason such as an external factor, it is possible to restart the charge if the electrically driven vehicle 10 does not move from a parking location subsequently.

Note that, in the above-mentioned description, the second predetermined value may be the same as the predetermined value specified in Step S150 or may be a different value. In a case where the second predetermined value is set to a value larger than the first predetermined value, it is possible to monitor for a longer period the state in which the electrically driven vehicle 10 is stationary, and hence there is an advantage in that it is possible to restart the charge after sufficiently confirming that there is no risk. Moreover, in a case where the second predetermined value is set to a value smaller than the first predetermined value, there is another advantage in that it is possible to confirm in a relatively short period (shortest necessary period) that the electrically driven vehicle 10 is stationary, to thereby restart the charge early.

As described above, according to the second embodiment, the same effects as in the first embodiment are obtained. Further, according to the second embodiment, the charge control unit 60 is configured to stop the charge once when detecting that the wheels 90 are rotating during the charge and subsequently restart the charge when determining that the state in which no occupant is in the vehicle and the wheels 90 are not rotating has continued for the predetermined period. Accordingly, the charge control unit 60 can restart the charge even if the electrically driven vehicle 10 has slightly moved from the parking location for some reason, as long as the electrically driven vehicle 10 does not subsequently move from the parking location. Therefore, it is possible to avoid a situation in that, when an occupant wants to use the electrically driven vehicle 10, an amount of stored electricity is not sufficient for using the electrically driven vehicle 10.

In the descriptions of the first embodiment and the second embodiment, the processing of determining the presence/absence of the rotations of the wheels 90 in Step S130 is carried out after the processing of determining the presence/absence of an occupant in Step S120. However, anyone of Steps S120 and S130 may be carried out first, or both of Steps S120 and S130 may be simultaneously carried out.

Moreover, in the first embodiment and the second embodiment, the electric power for charging the driving storage battery 20 is supplied from the power source outside the vehicle via the charge cable connected to the charge connector 40, and hence it should be understood that the charge processing is carried out only when the charge cable is connected.

The present invention can be used as the charge control for an electrically driven vehicle loaded with a driving storage battery charged by electric power supplied from a power supply outside the vehicle. The electrically driven vehicle is not limited to the electric vehicle and the plug-in hybrid vehicle, and the present invention can be applied to any types of electrically driven vehicle as long as the electrically driven vehicle is loaded with an electric power storage device charged by electric power supplied from a power source outside the vehicle. Accordingly, it should be understood that, also in this case, the same effects as the above-mentioned effects are obtained.

Also, the electric power storage device which is provided to the electrically driven vehicle according to the present invention is not limited to a driving storage battery, and the present invention can be applied to any types of electric power storage devices (for example, any types of capacitors and batteries etc.).

What is claimed is:

1. An electrically driven vehicle, comprising:
    an electric power storage device to be charged by electric power supplied from a power source provided externally;
    an occupant detection unit for detecting whether or not an occupant is in the electrically driven vehicle;
    a wheel rotation detection unit for detecting presence/absence of a rotation of a wheel provided to the electrically driven vehicle; and
    a charge control unit for determining whether or not a state in which the occupant detection unit detects that the occupant is not in the electrically driven vehicle and the wheel rotation detection unit detects that the wheel is not rotating has continued for a predetermined period, and starting the charge of the electric power storage device when determining that the state has continued for the predetermined period.

2. The electrically driven vehicle according to claim 1, further comprising a shift position switch for receiving a shift position instructed by the occupant, and outputting a signal representing a range of the instructed shift position,
    wherein, when the charge control unit determines, based on the signal output from the shift position switch, that the range of the shift position is a parking range, the charge control unit starts the charge without carrying out the detections by the occupant detection unit and the wheel rotation detection unit.

3. The electrically driven vehicle according to claim 1, wherein the charge control unit stops the charge when the charge control unit determines, during the charge, based on a detection result obtained by the wheel rotation detection unit, that the wheel is rotating.

4. The electrically driven vehicle according to claim 3, wherein, when the charge control unit stops the charge, independently of a detection result obtained by the occupant detection unit and the detection result obtained by the wheel rotation detection unit, the charge control unit does not restart the charge.

5. The electrically driven vehicle according to claim 3, wherein, when the charge control unit stops the charge, after the stop of the charge, the charge control unit determines whether the state in which the occupant detection unit determines that an occupant is not in the electrically driven vehicle and the wheel rotation detection unit detects that the wheel is not rotating has continued for a second predetermined period, and, when the charge control unit determines that the state has continued for the second predetermined period, the charge control unit restarts the charge of the electric power storage device.

6. A charge control method for an electrically driven vehicle loaded with an electric power storage device charged by electric power supplied from a power source provided externally, the charge control method comprising:
an occupant detection step of detecting whether or not an occupant is in the electrically driven vehicle;
a wheel rotation detection step of detecting presence/absence of a rotation of a wheel provided to the electrically driven vehicle;
a step of determining whether or not a state in which it is detected that the occupant is not in the electrically driven vehicle in the occupant detection step and it is detected that the wheel is not rotating in the wheel rotation detection step has continued for a predetermined period; and
a charge control step of starting, when it is determined that the state has continued for the predetermined period, the charge of the electric power storage device.

* * * * *